Patented July 10, 1951

2,560,031

UNITED STATES PATENT OFFICE 2,560,031

RUBBERY MIXTURE OF BUTADIENE-STYRENE COPOLYMER AND POLYBUTADIENE

Delbert C. Cline, Silver Lake Village, Ohio, assignor to The Firestone Tire & Rubber Company, Akron, Ohio, a corporation of Ohio No Drawing. Application March 20, 1946,
Serial No. 655,884

3 Claims. (Cl. 260—45.5)

This invention relates to improved rubber-like compositions.

As a result of the wartime interruptions in trade with the rubber producing area of the world, synthetic rubber-like materials have been largely substituted for natural rubber. Coinciding with the arising of the need for substitution was the need for articles of rubber-like composition adaptable to new types of military equipment and serviceable under conditions so severe that articles of conventional natural rubber fabrication would never have been practical. For example, vast quantities of military equipment had to be built to function under the most severe conditions likely to be encountered in Arctic operations, and the low temperatures found in the atmosphere at the levels at which high altitude airplanes operate. As the greater part of the equipment was mobile, much synthetic rubber had to be provided for tires, cushions, resilient mountings, hoses, wire insulations, fabric coatings, and many other articles. The natural rubber substitute considered most suitable for tires at the time of the conversion to large scale synthetic rubber manufacturing was the butadiene-styrene emulsion polymerized copolymer, otherwise known and herein often referred to as GR–S.

Under the most severe Arctic and high altitude conditions, temperatures are often reached which are as low or even lower than the brittleness temperatures of rubber as well as GR–S compositions such as are used in tire treads and sidewalls. A rubber or synthetic rubber vulcanizate becomes progressively harder and stiffer as the brittleness point is approached. This effect is noticeable at some temperature generally below 0° F. Therefore a vulcanized rubber or synthetic rubber article substantially loses its utility as a resilient and rubber-like object at temperatures considerably above the brittleness point temperature. Moreover, in the temperature range immediately approaching the brittleness point, stiffness in the synthetic rubber article becomes very pronounced. Flex cracks are readily produced when there is a necessity for rapid and violent flexing such as occurs in the tire of an airplane when landing at temperatures well below 0° F. The brittleness point herein referred to is that which is obtained by the Bell Laboratory Brittleness Tester.

It is an object of this invention to increase the freeze resistance of vulcanized compositions containing the rubber-like copolymers of butadiene and styrene. It is an object also while increasing the freeze resistance of the said vulcanizates, to preserve and increase, if possible, such physical properties as tensile strength, elongation and modulus of elasticity. It is an object, furthermore, to avoid the use of non-rubber-like plasticizers and freeze-point depressants in order to obtain freeze-point resistance in vulcanizates of butadiene-styrene copolymers. Other objects will become apparent as the invention is described.

The above and other objects of the invention are fulfilled by mixing an unvulcanized composition containing a butadiene-styrene copolymer with an emulsion polymer of butadiene, and thereafter vulcanizing the mixture. Polybutadiene is added to GR–S compositions up to 40 parts polybutadiene per 100 parts of mixed polybutadiene and GR–S to improve physical properties generally, such as tensile strength, elongation, and modulus; an optimum of improvement is obtained in the range of fifteen to twenty parts polybutadiene per one hundred of polybutadiene and GR–S. However, freeze resistance is progressively improved by increasing proportions of polybutadiene. Ordinarily, freeze resistance is obtained in rubber-like compositions by including in the formula a plasticizer said to increase freeze resistance, such as dibutyl sebacate, dibutyl phthalate or dibutyl adipate. However, the quantities of such a plasticizer which must be used to obtain appreciable freeze resistance are such that the physical properties i. e., tensile strength, elongation, and modulus of elasticity, etc., are reduced in the resulting vulcanizate.

Consequently, a plasticizer of this type is added only in amounts which will cause the rubber-like composition to have a desired degree of freeze resistance, thereby keeping degradation of other physical properties to a minimum. An emulsion polymerized polybutadiene may be substituted for such a plasticizer to reach lower brittleness points than are possible with any known conventional plasticizer. Moreover, addition of polybutadiene to GR–S in the ranges of mixtures to be indicated actually results in vulcanizates of improved physical properties.

The following examples will illustrate the effectiveness of polybutadiene as compared with dibutyl sebacate for increasing freeze resistance of a typical fabric spreading stock, without substantial loss of physical properties. In the table below a separate formula is listed for each example. The coal tar distillate was manufactured by the Barrett Division of the Allied Chemical and Dye Corporation.

| Example | 1 | 2 | 3 | 4 |
|---|---|---|---|---|
| Ingredients | Parts | Parts | Parts | Parts |
| GR–S | 100 | 100 | 100 | 100 |
| Polybutadiene | | | 10 | |
| N-cyclohexyl-2-benzothiazyl sulfenamide | 1.5 | 1.5 | 1.5 | 1.5 |
| Zinc oxide | 6 | 6 | 6 | 6 |
| Carbon black | 30 | 30 | 30 | 30 |
| Sulfur | 2 | 2 | 2 | 2 |
| Cumar resin | 10 | 10 | 10 | 10 |
| Phenyl beta naphthylamine | 1 | 1 | 1 | 1 |
| Pine tar | 2 | 2 | 2 | 2 |
| Stearic acid | 2 | 2 | 2 | 2 |
| Coal tar distillate | 3 | 3 | 3 | 3 |
| Dibutyl sebacate | | | 5 | 10 |
| *Physical Tests* | | | | |
| Tensile strength in lbs./in.$^2$ | 1,325 | 1,325 | 1,000 | 900 |
| Per cent elongation at break | 430 | 420 | 380 | 390 |
| Breaking temperature (°F.) | −65.9 | −74 | −72 | −74 |

From the foregoing examples it should be noted in the physical test data that freeze resistance obtained with a liquid plasticizer such as dibutyl sebacate is accompanied by appreciable loss of tensile strength and elongation. Polybutadiene may be used in similar quantities for comparable freeze resistance without causing any considerable loss of the above listed physical properties.

The following examples will illustrate the use of polybutadiene as agent for increasing freeze resistance in a tire tread stock when mixed according to the formula listed below. GR–S designates an emulsion-polymerized copolymer of 75 per cent butadiene and 25 per cent styrene; "Ratio" refers to parts of pure GR–S to parts of polybutadiene in 100 parts of both elastomers combined.

| Example | 5 | 6 | 7 | 8 | 9 | 10 |
|---|---|---|---|---|---|---|
| Ratio | 100–0 | 90–10 | 80–20 | 70–30 | 60–40 | 50–50 |
| Ingredient | Parts | Parts | Parts | Parts | Parts | Parts |
| GR–S | 300 | 270 | 240 | 210 | 180 | 150 |
| Polybutadiene | | 30 | 60 | 90 | 120 | 150 |
| Sulfur | 5.13 | 5.13 | 5.13 | 5.13 | 5.13 | 5.13 |
| Phenyl beta naphthylamine | 1.83 | 1.83 | 1.83 | 1.83 | 1.83 | 1.83 |
| Pine tar oil | 7.89 | 7.89 | 7.89 | 7.89 | 7.89 | 7.89 |
| Stearic acid | 7.20 | 7.20 | 7.20 | 7.20 | 7.20 | 7.20 |
| Channel black | 135.80 | 135.80 | 135.80 | 135.80 | 135.80 | 135.80 |
| Coal tar distillate | 12.08 | 12.08 | 12.08 | 12.08 | 12.08 | 12.08 |
| N-cyclohexyl-2-benzothiazyl sulfenamide | 3.72 | 3.72 | 3.72 | 3.72 | 3.72 | 3.72 |
| Zinc oxide | 7.35 | 7.35 | 7.35 | 7.35 | 7.35 | 7.35 |
| | 481.00 | 481.00 | 481.00 | 481.00 | 481.00 | 481.00 |

Cold test by the Bell Laboratory Brittleness Tester on samples cure 60 minutes at 285° F.

| Example | 5 | 6 | 6 | 8 | 9 | 10 |
|---|---|---|---|---|---|---|
| Unbroken at (°F.) | 67.0 | 72.2 | 77.8 | 84 | 84 | 95.8 |
| Broken at (°F.) | 68.8 | 72.4 | 79.6 | 87 | 87 | |

Physical test data listed below are obtained on samples cured 60 minutes at 285° F. from the above examples:

| Example | 5 | 6 | 7 | 8 | 9 | 10 |
|---|---|---|---|---|---|---|
| Tensile strength, in lbs./in.$^2$ | 2,500 | 2,500 | 2,200 | 2,000 | 1,700 | 1,700 |
| Modulus in lbs./in.$^2$ at 200 per cent elongation | 500 | 475 | 525 | 525 | 625 | 525 |
| Per cent elongation at break | 580 | 590 | 580 | 520 | 420 | 460 |

In the examples described below, physical testing data were obtained on seven formulations in which the elastomeric components varied from 100 per cent butadiene-styrene polymer through various proportions, to 100 per cent polybutadiene. From the testing data listed below, another important feature of the invention will be obvious, namely, that vulcanizable compositions containing mixtures of polybutadiene and butadiene-styrene copolymer, within a certain range, are superior to vulcanizable compositions including either one hundred per cent polybutadiene or one hundred per cent butadiene-styrene copolymer as the elastomeric component. The asphalt residue was produced during cracking crude petroleum and was sold by the C. P. Hall Company. The physical test data and the formula relating to the various examples are as follows:

| Examples | 11 | 12 | 13 | 14 | 15 | 16 | 17 |
|---|---|---|---|---|---|---|---|
| Ratio | 100–0 | 88.5–11.5 | 76.5–23.5 | 65–36 | 51.6–48.4 | 26.4–73.6 | 0–100 |
| Ingredient | Parts | Parts | Parts | Parts | Parts | Parts | Parts |
| GR–2 | 100 | 93.5 | 80.1 | 66.75 | 53.4 | 26.7 | |
| Polybutadiene | | 12.5 | 25.0 | 37.5 | 50.0 | 75.0 | 100 |
| Stearic acid | 2.5 | 2.66 | 2.65 | 2.61 | 2.59 | 2.55 | 2.5 |
| Coal tar distillate | 4.0 | 4.24 | 4.17 | 4.07 | 4.14 | 4.07 | 4.0 |
| Asphalt residue | 2.6 | 2.76 | 2.74 | 2.71 | 2.69 | 2.65 | 2.6 |
| Zinc oxide | 2.4 | 5.55 | 2.54 | 2.51 | 2.48 | 2.44 | 2.4 |
| Sulfur | 1.7 | 1.80 | 1.79 | 1.78 | 1.76 | 1.73 | 1.7 |
| Channel black | 45.0 | 47.75 | 47.35 | 46.9 | 46.55 | 45.78 | 45.0 |
| Benzothiazyl disulfide | 1.5 | 1.60 | 1.58 | 1.57 | 1.56 | 1.53 | 1.5 |
| | 159.7 | 169.36 | 167.95 | 166.50 | 167.15 | 162.45 | 157.7 |

In the formulae listed above it will be noted that while the amounts of any particular ingredient vary throughout the examples, the percentage of that ingredient based on total parts in each example remains almost identical and the following physical test data are, therefore, based on highly comparable formulae.

| Example | 11 | 12 | 13 | 14 | 15 | 16 | 17 |
|---|---|---|---|---|---|---|---|
| Modulus in lbs./sq. in. at 300% (Normal): | | | | | | | |
| 40 min. cure at 280° F | 150 | 100 | 100 | 100 | 125 | 125 | 175 |
| 80 min. cure at 280° F | 450 | 450 | 450 | 375 | 425 | 400 | 325 |
| 160 min. cure at 280° F | 875 | 650 | 750 | 625 | 675 | 625 | 650 |
| Modulus in lbs./sq. in. at 300% (Aged 4 days at 212° F.): | | | | | | | |
| 40 min. cure at 280° F | 800 | 775 | 775 | 850 | 700 | 525 | 600 |
| 80 min. cure at 280° F | 1,550 | 1,575 | 1,550 | 1,575 | 1,475 | 1,300 | 1,225 |
| 160 min. cure at 280° F | 1,750 | 1,725 | 1,750 | 1,675 | 1,650 | 1,425 | 1,275 |
| Tensile strength in lbs./in.$^2$ (Normal): | | | | | | | |
| 40 min. at 280° F | 475 | 425 | 350 | 325 | 275 | 250 | 300 |
| 80 min. at 280° F | 2,100 | 2,425 | 2,675 | 2,050 | 1,700 | 1,225 | 1,175 |
| 160 min. at 280° F | 2,550 | 2,850 | 2,575 | 2,600 | 2,275 | 1,925 | 1,700 |
| Tensile strength in lbs./in.$^2$ (Aged 4 days at 212° F.): | | | | | | | |
| 40 min. at 280° F | 2,300 | 2,550 | 2,250 | 2,425 | 2,025 | 1,575 | 1,500 |
| 80 min. at 280° F | 1,800 | 1,850 | 1,725 | 1,925 | 1,775 | 1,550 | 1,350 |
| 160 min. at 280° F | 2,050 | 2,325 | 1,875 | 1,825 | 1,800 | 1,625 | 1,275 |
| Per cent elongation at break (Normal): | | | | | | | |
| 40 min. at 280° F | 780 | 790 | 800 | 710 | 700 | 580 | 520 |
| 80 min. at 280° F | 750 | 760 | 700 | 730 | 700 | 610 | 645 |
| 160 min. at 280° F | 600 | 680 | 600 | 670 | 600 | 590 | 560 |
| Per cent elongation at break (Aged 5 days at 212° F.): | | | | | | | |
| 40 min. at 280° F | 650 | 670 | 630 | 640 | 650 | 600 | 580 |
| 80 min. at 280° F | 325 | 350 | 320 | 360 | 350 | 350 | 320 |
| 160 min. at 280° F | 320 | 380 | 300 | 320 | 320 | 320 | 290 |
| Brittleness point (° F.) | −65 | | −69.5 | | −82 | −87 | −87 |

From the above physical testing data it will be seen that the highest values in tensile strength were obtained in Examples 12, 13, and 14 which embrace a range of 11.5 to 36 parts of polybutadiene per 100 parts of the elastomeric component, i. e., polybutadiene and GR-S. The modulus and elongation values in general also reach optimum values in this range of GR-S to polybutadiene mixtures. A closer inspection of the data indicates that the optimum combination of tensile, elongation and modulus is obtained at some ratio in the range described and limited by Examples 12 and 13, i. e., between 11.5 and 23.5 parts polybutadiene per 100 parts of GR-S and polybutadiene. The brittleness point data relating to Examples 11 to 17 also shows clearly the increase in freeze resistance obtained through the use of a wide range of GR-S polybutadiene mixtures.

This invention, therefore, as shown in the seventeen examples achieves a very remarkable result. Tensile strength, elongation and modulus are progressively improved in compositions typified by Examples 11 to 13 inclusive, through the range of one to approximately twenty parts of polybutadiene and ninety-nine to approximately eighty parts respectively of a butadiene-styrene copolymer. Freeze resistance of these compositions is progressively improved also. If the proportion of polybutadiene is increased to about 40 parts per 100 parts of mixed polymer, the physical properties diminish to approximately those exhiibted by a similarly mixed composition which contains only GR-S as the elastomeric component but contains no polybutadiene; mean-while the freeze resistance is progressively improved with increasing proportions of polybutadiene. In the practice of this invention, it has been found desirable therefore, when freeze resistance is the property most desired, that polybutadiene may be substituted for portions up to 30 per cent of the diolefin-styrene copolymer included in a vulcanizable composition without causing appreciable diminution of the other physical properties. It is understood, of course, that greater substitution of polybutadiene may be made to obtain greater freeze resistance but that further diminution of physical properties may be expected.

However, the present invention is much broader in scope than the above examples, which have been limited particularly with respect to the materials employed, in order to illustrate the physical properties obtained when the GR-S polybutadiene ratios are changed. The materials used and their relative proportions and the physical conditions under which they are treated are all subject to wide variation.

While butadiene-1,3 is the diolefin normally used in preparation of the GR-S polymer and the emulsion polymerized polybutadiene included in the examples, polymers and copolymers containing styrene or other diolefins such as isoprene, dimethyl-2,3-butadiene-1,3 and other homologs of butadiene-1,3 are included by the present invention. In the preparation of the copolymer, styrene may be replaced by other styrene hydrocarbons such as alpha or para methyl styrene, monochlor styrene and dichloro styrene to provide compositions of slightly different characteristics but when mixed with an emulsion polymerized diolefin, they serve the objectives of this invention. The preparation of any of the copolymers or polymers included in the mixtures which are contemplated by this invention is effected by carrying out a polymerization such as currently used in the manufacture of the GR-S polymer, namely, in aqueous emulsion at approximately 122° F. It is to be understood, however, that polymerization may be effected by infinite variations in the proportions and types of ingredients, i. e., catalysts, emulsifying agents, etc.

Modifications may be resorted to and proportions varied without departing from the spirit of the invention or the scope thereof as defined by the appended claims.

What is claimed is:

1. A vulcanizate characterized by superior tensile strength, elongation, modulus and freeze resistance including eleven and one half to twenty-three and one half parts of rubbery polybutadiene prepared by homopolymerization of 1,3-butadiene in aqueous emulsion at 122° F. and eighty-eight and one half to seventy-six and one half parts of a rubbery butadiene-styrene copolymer.

2. A vulcanizate characterized by superior tensile strength, elongation, modulus and freeze resistance including ten to forty parts of rubbery polybutadiene prepared by homopolymerization of 1,3-butadiene in aqueous emulsion at 122° F. and ninety to sixty parts of a rubbery butadiene-styrene copolymer.

3. A method of making a vulcanized rubbery article possessing superior freeze resistance while maintaining high tensile strength, elongation and modulus properties, which includes mixing ten to forty parts of a rubbery polybutadiene prepared by homopolymerization of 1,3-butadiene in aqueous emulsion at 122° F. with ninety to sixty parts of a rubbery butadiene-styrene copolymer, and vulcanizing the resulting mixture.

DELBERT C. CLINE.

REFERENCES CITED

The following references are of record in the file of this patent:

UNITED STATES PATENTS

| Number | Name | Date |
|---|---|---|
| 2,365,405 | Gartner | Dec. 19, 1944 |
| 2,427,192 | Brovsky | Sept. 9, 1947 |
| 2,514,194 | Cline | July 4, 1950 |

OTHER REFERENCES

Liska, pages 40–46, Ind. & Eng. Chem., January 1944.

Johnson, page 54, column 1, "Rubber Age," April 1949.

McMillan et al., pages 663, 666 and 669, India Rubber World, February 1946.

Tudor, page 13, India Rubber Journal, December 23, 1944.

Rubber Reserve Co., Specifications for Government Synthetic Rubbers, 1945, page A-1-a.

Baldwin et al., pages 433–435, Rubber Age, February 1944.

Selker et al., pages 157 and 160, Ind. & Eng. Chem., February 1942.

Conant et al., pages 767, 773, 774, Journal of Applied Physics, November 1944.

Fraser et al., pages 11, 12 and 13, "The Neoprenes," Report No. 42-3, September 1942, Rubber Chem. Div., Du Pont Co.

Neoprene Report BL–149 (3 pages) Pub. March 25, 1944 by Rubber Chem. Div., Dupont Co.